United States Patent [19]

Rodgers

[11] 4,297,586

[45] Oct. 27, 1981

[54] PHOTO-ELECTRIC DIGITAL CIRCUIT FOR MONITORING STRIP LOOP POSITION

[76] Inventor: John M. Rodgers, 12990 Club Dr., Redlands, Calif. 92373

[21] Appl. No.: 124,628

[22] Filed: Feb. 25, 1980

[51] Int. Cl.³ .......................................... G01N 21/86
[52] U.S. Cl. ...................................... 250/561; 226/42
[58] Field of Search ............... 250/561, 214 A, 214 R; 226/42

[56] References Cited

U.S. PATENT DOCUMENTS

| | | | |
|---|---|---|---|
| 2,907,565 | 10/1959 | Sauter | 226/42 |
| 3,177,749 | 4/1965 | Best et al. | 250/561 X |
| 3,240,411 | 3/1966 | Zarleng | 226/42 |

*Primary Examiner*—David C. Nelms
*Assistant Examiner*—Edward P. Westin
*Attorney, Agent, or Firm*—LeBlanc, Nolan, Shur & Nies

[57] ABSTRACT

Apparatus for monitoring strip loop position, having a plurality of light sources and a corresponding plurality of photo-detectors spaced from each other in the strip loop reservoir on opposite sides of the strip loop path; each photo-detector is connected to the input of a corresponding photocell amplifier which is normally biased to be driven to positive or negative saturation as a function of the input voltage applied to the photocell amplifier. The outputs of all the photocell amplifiers are coupled together through a summing junction to the input of an output amplifier for amplifying the voltage and current signals appearing at the summing junction. Display and/or control means are coupled to the output of the output amplifier.

5 Claims, 3 Drawing Figures

PHOTO-ELECTRIC DIGITAL CIRCUIT FOR MONITORING STRIP LOOP POSITION

BACKGROUND OF THE INVENTION

This invention relates to a system for monitoring and controlling strip material movement. More particularly, the invention relates to a system for monitoring and controlling strip material to be drawn through one or more work stations at a constant rate. Operations involving, for example, the working of steel strip material often require that the material move through the work stations at a constant and/or controlled rate unaffected by variations in the unspoiling rate. In operations involving the continuous coating of metal strip material, for example, the strip may be run through the coating stations at speeds of 600 feet per minute or more. The uncoated metal is usually supplied from rolls; at relatively frequent intervals, the leading edge of a new roll of uncoated metal must be welded to the trailing end of the preceding roll. This is accomplished by stopping the feed movement long enough to weld the trailing end of the preceding roll end to the leading end of the suceeding strip. After welding is completed, the strip resumes forward movement to feed from the new supply reel.

A depending loop is formed in the strip material at one or more locations along the path of strip movement to provide a temporary reservoir of strip. As is well known to those skilled in the art, the depending loop acts as a pool or reservoir from which strip can be drawn when the supply is temporarily stopped. As is apparent, it is necessary to provide means for monitoring the loop so that the system operator can gauge the amount of time the supply feed can be stopped. In addition, loop monitor systems provide an indication of problems occurring in movement of the strip through the system.

One known type of loop monitor/control system utilizes a photocell arrangement to detect the amount of strip in the loop. Photocell loop control systems are shown in U.S. Pat. No. 2,448,823 issued Sept. 7, 1948 to F. K. Schefe; U.S. Pat. No. 2,907,565 issued Oct. 6, 1959 to J. D. Sauter; U.S. Pat. No. 3,236,429 issued Feb. 22, 1966 to S. Klein; U.S. Pat. No. 3,240,411 issued Mar. 15, 1966 to S. A. Zarleng.

The present invention provides a loop monitor and control system using photocell detectors. The invention incorporates certain new and advantageous features not found in the prior árt. The photo-electrical digital loop monitor and control system of this invention provides remote indication of loop position. The system has inherent balance, linearity and gain, which eliminate the need for gain or photocell adjustment rheostats. In addition, the system is essentially immune to noise, uses standard reliable solid state components, is simple to understand, test and repair, and requires no active components in the scanner.

SUMMARY OF THE INVENTION

The present invention comprises an apparatus for monitoring strip loop position, having a plurality of light sources spaced from each other, preferably along a substantially vertical line in the strip loop reservoir. A corresponding plurality of photo-detectors are located in the reservoir on an opposite side of the strip loop path. Each photo-detector is connected to the input of a corresponding photocell amplifier which is normally biased to be driven to positive or negative saturation as a function of the input voltage applied to the photocell amplifier. The outputs of all the photocell amplifiers are coupled together through a summing junction to the input of an output amplifier for amplifying the voltage and current signals appearing at the summing junction. Means such as a voltmeter and ammeter are coupled to the output of the output amplifier for detecting and displaying the amplified current and voltage signals. Control means driven by the output of the output amplifier may be used to control movement of the strip through the reservoir.

DESCRIPTION OF THE PREFERRED EMBODIMENT

Figure 1:
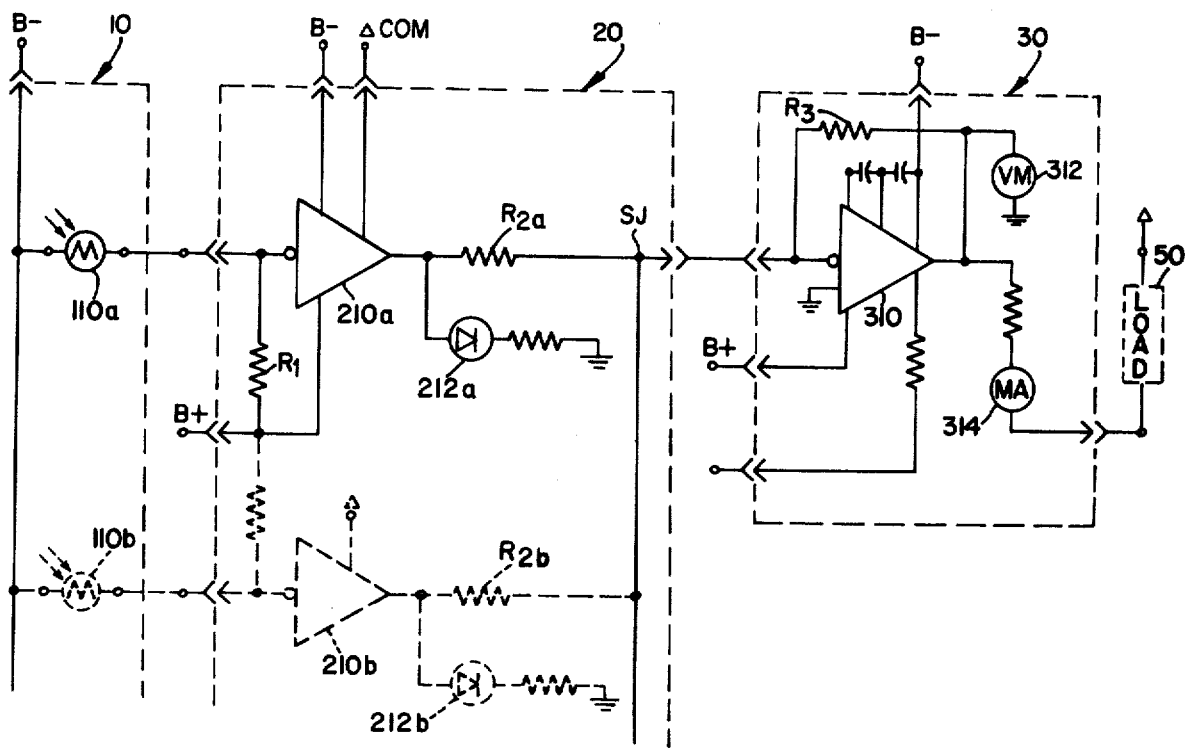
FIG. 1 is a circuit diagram of the loop control of this invention.

FIG. 1 is a circuit diagram of one embodiment of the photo-electric digital loop control of this invention. The loop control circuit comprises a scanner section 10, a photocell amplifier section 20 and an output amplifier section 30.

The scanner section 10 comprises a plurality of photocells, 110a, 110b, . . . 110n. In one contemplated application 16 photocells are mounted in line on an elongated base member 40 (FIGS. 2A, 2B) described in more detail below. The photo-detectors and associated light sources are mounted on opposite sides of a strip loop reservoir or bin (not shown). Such mounting arrangements are well known in the art as exemplified by the aforementioned Schefe, Sauter and Klein patents.

The photocell amplifier section 20 comprises a plurality of open loop operational amplifiers 210a, 210b, . . . 210n, biased to operate in their saturated region and corresponding in a number to the photocells 110a, 110b, . . . 110n. In the embodiment described herein, each photocell and photocell amplifier circuit is substantially identical. For convenience, hereafter, except as otherwise required for clarity, the following description will refer generally to photocells 110 and photocell amplifiers 210.

One terminal of each photocell 110 is connected in series with a resistive impedance $R_1$ across voltage sources B+ and B—. The summing junction of each photocell 110 and resistor $R_1$ is connected to the inverting input of its corresponding open loop amplifier 210. The output of each amplifier 210 is coupled through an associated resistor $R_2$ to a common summing junction SJ, which in turn is connected to the inverting input of output amplifier 310.

The output of amplifier 310 is coupled to a load 50, which may comprise a mechanism for adjusting the loop length as is known in the art. Load 50 may, for example, comprise a motor drive control to control loop position; one such motor drive control is described in the aforementioned Klein patent. The invention also includes a center zeroing voltmeter 312 and a center zeroing ammeter 314, each coupled to the output of amplifier 310 as shown in FIG. 1.

A feedback resistance $R_3$ coupled between the output and input of amplifier 310. The value of this resistor varies as a function of the number of scanners 10 used in the system. For example, where each scanner 10 comprises 16 photocells 110, the value of resistance $R_3$ is shown in the following table:

| Number of Scanners | Value of $R_3$ (in ohms) |
| --- | --- |
| 1 | 1250 |
| 2 | 625 |
| 3 | 412 |

As an additional feature of this invention, a light emitting diode (L.E.D.) 212a, 212b, etc. is coupled to the output of a corresponding amplifier 210a, 210b, etc. L.E.D.'s 212 provide a visual indication of the operational state of their respective amplifiers 210, and thus a quick visual indication of the location of the strip loop in the reservoir or bin.

In one preferred embodiment, photocells 110 are VT512L cells, amplifiers 210 comprise quad operational amplifiers RC4136N manufactured by Texas Instruments, amplifier 310 is a model 3033A, and a ±15 volt 200 ma power supply Model 920 manufactured by Analog Devices provides the B+, B− and ground base. L.E.D.'s 212 are model FLV102. The identification of these components is exemplary only and is not intended in any way to limit the scope of this invention.

Referring to the above described system, particularly as shown in FIG. 1, it will be seen that the input voltage to photocell amplifier 210 is a function of the voltage drop across the variable resistance of photocell 110. In the dark condition (assuming low ambient light level impinging on the photocell), the photocell resistance is high and much larger than resistance $R_1$. A positive input voltage is applied to the photocell amplifier 210 of an amplitude large enough to drive the output of photocell amplifier 210 to its negative voltage limit (e.g. approximately −10 VDC for the components indicated). If all photocells 110 are dark, i.e. the strip is at or below the lower detection limit, the inputs of all photocell amplifiers 210 will be biased positive and the outputs thereof will all be driven to negative saturation. In the configuration shown, all of L.E.D.'s 212 will be reverse biased (in the off condition) and will not conduct.

As the strip position changes to move out of the source-detecter light path of a photocell 110, that cell will become illuminated. The resistance of the illuminated cell will decrease until it becomes substantially less then the resistance of fixed biased resistor $R_1$. The voltage at the input of photocell amplifier 210 swings negative as the resistance of photocell 110 decreases. As the input voltage passes through zero the amplifier 210 is triggered to switch the state of its output voltage, similar to a bistable or flip-flop. Preferably and advantageously, the light intensity on the illuminated photocell should be of a magnitude large enough to reduce the photocell resistance sufficiently to drive the input voltage of the photocell amplifier 210 to its limit in the positive direction (approximately +10 VDC for the above described exemplary components). The summing junction voltage swing of the photocell amplifier input will thus be ±10 VDC from dark to light.

The sum of the outputs of all of the photocell amplifiers 210 are summed at summing junction SJ to drive output amplifier 310. Therefore, each time a photocell amplifier output changes state, the input voltage to amplifier 310 changes and the output voltage thereof changes substantially linearly with changes in input voltage. These changes are detected visually by voltmeter 312 and ammeter 314 to provide a remote visual indication of the strip loop position relative to the upper and lower measurement limits.

In the configuration shown in FIG. 1, when the output of a photocell amplifier 210 swings positive, the corresponding L.E.D. 212 becomes biased in the forward direction to permit current to pass therethrough and become lighted. Thus, in addition to supplying a current into the summing junction input to the output amplifier, each photocell amplifier will also drive a light emitting diode (L.E.D.). This feature offers remote observation of loop position. It also serves to indicate the status of each amplifier feeding the output amplifier summing junction. Loop control which heretofore had to be located close to the loop for visual observation of the loop during calibration can now be located remote from the loop for the convenience of the operator or motor inspector.

When the loop position is in the center of the scanner (half of the photocells lighted), the loop control output voltage will be substantially zero. The dark photocell amplifiers are biased into saturation to have maximum negative outputs. Conversely, the illuminated photocell amplifiers will be saturated in the opposite direction to provide output currents and voltages having the same magnitude but opposite polarity. All of the photocell amplifiers feed into a common summing junction SJ input to the output amplifier. The voltage and current appearing at the input to output amplifier 310 comprises the algebraic sum of the voltages and currents at the outputs of photocell amplifiers 210a, 210b, . . . , 210n.

When equal numbers of photocells are dark and illuminated, the net sum of currents into summing junction SJ is substantially zero. The current into the input of output amplifier 310 is substantially zero; the voltage and current measured at the output of amplifier 310 will also be substantially zero. This feature eliminates the need for a loop balance rheostat, such as heretofore required to adjust the null when the loop position is centered in the scanner.

The present invention also has inherent linearity and gain. Normal dirt accumulation, light source intensity change or minor photocell resistance variation will not have an adverse affect on the linearity or gain of the loop control (linearity is defined as the directly proportional relationship of the loop position to the loop control output). The gain and linearity is established by open loop operational amplifiers working in a saturated or clamped state. Each photocell amplifier will thus contribute a substantially equal current into the summing junction of the output amplifier. Since the linearity and gain are established by fixed resistors, no gain or photocell adjustment rheostats are required.

Additional features of this invention are that it is simple to understand, test and repair; it is immune to noise; it uses standard, reliable solid state components. No rheostats are required for calibration. No active components are used in the scanner. With the addition of relay drivers, upper and lower scanner limits can be reliably determined. This feature will permit a strip-above-or-below-scanner signal for alerting the operator when the strip is out of position. This signal can also be used for speedup or slowdown for rapid loop recovery.

Figure 2A:
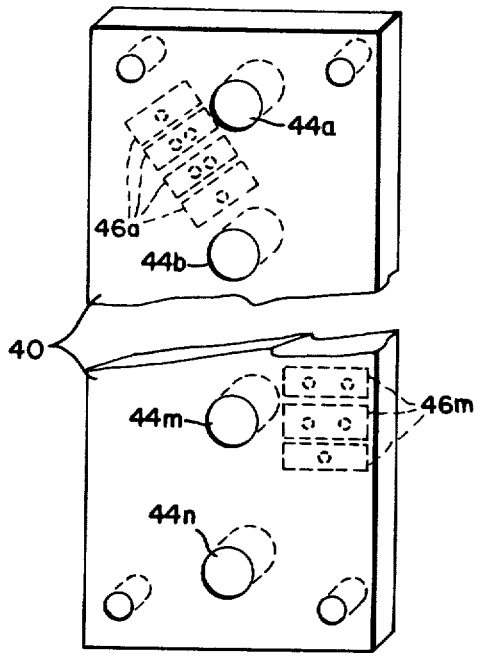
FIG. 2A is a perspective plan view of the photocell scanner mounting plate.
Figure 2B:
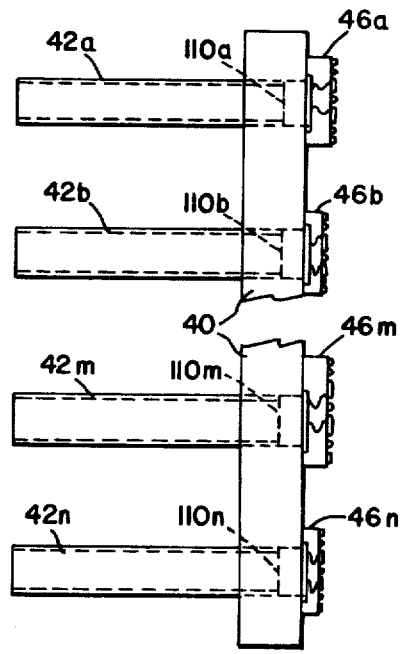
FIG. 2B is a side view of the mounting plate of FIG. 2A showing the photocells mounted thereon.

FIGS. 2A and 2B show perspective plan and side views, respectively, of the photocell scanner mounting. Preferably and advantageously, each photocell 110 is mounted at one end of an elongated hollowed out tube 42. The inside of the tube 42 is preferably painted flat black to absorb most or substantially all stray ambient illumination which might otherwise impinge on the photocell. The tubes 42 are located in throughholes provided in an elongated plate 40. Preferably and advantageously, the centers of throughholes 44 are aligned along a single longitudinal axis of the plate 40. Terminal blocks 46, corresponding in number to photocells 110, are mounted to the back of plate 40 to provide an electrical connection terminal for the photocell leads.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for monitoring strip loop position in a strip loop reservoir comprising:

a plurality of light sources and a corresponding plurality of photo-detectors spaced from each other on opposite sides of the strip loop path in the strip loop reservoir;

a plurality of first amplifying means, each said first amplifying means having its input coupled to a corresponding photo-detector, said first amplifying means being normally biased to be driven substantially to positive or negative saturation as a function of the input voltage applied to said first amplifying means through said corresponding photo-detector, the outputs of said plurality of first amplifying means being coupled together at a summing junction;

second amplifying means having its input coupled to the summing junction for amplifying the voltage and current signals appearing at said summing junction; and means coupled to the output of said second amplifying means for remotely visually monitoring the strip loop position as a function of the output of said second amplifying means.

2. Apparatus according to claim 1, further comprising a plurality of further summing junctions, each comprising one of said photo-detectors and a resistive impedance coupled in series between opposite polarity voltage sources; wherein the inputs of said first amplifying means are coupled to respective ones of said summing junctions.

3. Apparatus according to claim 1 or 2, wherein each of said first amplifying means comprises an open loop operational amplifier biased to operate in its saturated region.

4. Apparatus according to claim 3, further comprising a plurality of photo emitting means, each coupled to the output of a corresponding first amplifying means for providing a visual indication of strip loop position and operational status of said first amplifying means as a function of the voltage output of said first amplifying means.

5. Apparatus according to claim 4, wherein said remote monitoring means comprises a center zeroing voltmeter and a center zeroing ammeter.

* * * * *